US012658423B2

(12) United States Patent
Ji et al.

(10) Patent No.: US 12,658,423 B2
(45) Date of Patent: Jun. 16, 2026

(54) RECHARGEABLE ZINC METAL BATTERY

(71) Applicant: GROTTHUSS, INC., Albany, OR (US)

(72) Inventors: Xiulei Ji, Portland, OR (US); Heng Jiang, State College, PA (US)

(73) Assignee: GROTTHUSS, INC., Portland, OR (US)

( * ) Notice: Subject to any disclaimer, the term of this patent is extended or adjusted under 35 U.S.C. 154(b) by 762 days.

(21) Appl. No.: 17/867,672

(22) Filed: Jul. 18, 2022

(65) Prior Publication Data

US 2023/0018070 A1 Jan. 19, 2023

Related U.S. Application Data

(60) Provisional application No. 63/223,414, filed on Jul. 19, 2021.

(51) Int. Cl.
| | |
|---|---|
| *H01M 4/24* | (2006.01) |
| *H01M 10/24* | (2006.01) |
| *H01M 10/26* | (2006.01) |
| *H01M 10/28* | (2006.01) |

(52) U.S. Cl.
CPC ............. *H01M 4/244* (2013.01); *H01M 4/24* (2013.01); *H01M 10/24* (2013.01); *H01M 10/26* (2013.01); *H01M 10/28* (2013.01)

(58) Field of Classification Search
CPC ...... H01M 4/244; H01M 10/24; H01M 10/26; H01M 4/24; H01M 10/28
See application file for complete search history.

(56) References Cited

U.S. PATENT DOCUMENTS

| | | | |
|---|---|---|---|
| 2016/0301096 A1 | 10/2016 | Zhamu et al. | |
| 2020/0176198 A1 | 6/2020 | Adams | |
| 2021/0336293 A1 | 10/2021 | Ji et al. | |

FOREIGN PATENT DOCUMENTS

| | | |
|---|---|---|
| CN | 106571461 A | 4/2017 |
| CN | 111509306 A | 8/2020 |
| KR | 10-2019-0140043 A | 12/2019 |
| WO | 2020-076985 A1 | 4/2020 |

OTHER PUBLICATIONS

International Search Report & Written Opinion dated Nov. 9, 2022 from counterpart App No. PCT/US2022/037523.
Wu et al; Diffusion-free Grotthuss topochemistry for high-rate and long-life proton batteries; Nature Energy vol. 4 p. 123 (Feb. 2019).

*Primary Examiner* — Laura Weiner
(74) *Attorney, Agent, or Firm* — David S. Alavi

(57) ABSTRACT

A rechargeable zinc metal battery cell includes a zinc metal anode, a cathode, a porous separator between them, and an electrolyte composition absorbed by the porous separator and in contact with both anode and cathode. The electrolyte composition includes (i) an aqueous solution of zinc chloride at a concentration greater than 15 molal, and (ii) dimethyl carbonate present at a mass ratio between 0.1:1.0 and 1.0:1.0 with respect to water in the aqueous solution. In some examples: the anode includes zinc metal foil stacked on titanium metal foil; the cathode includes vanadium(V) phosphate; the porous separator includes glass fibers and is less than 200 μm thick; or the electrolyte composition includes (i) an aqueous solution of 30 molal zinc chloride, 5 molal lithium chloride, and 10 molal trimethyl ammonium chloride, and (ii) dimethyl carbonate present at a mass ratio of 1.0:1.0 with respect to water in the aqueous solution.

24 Claims, 3 Drawing Sheets

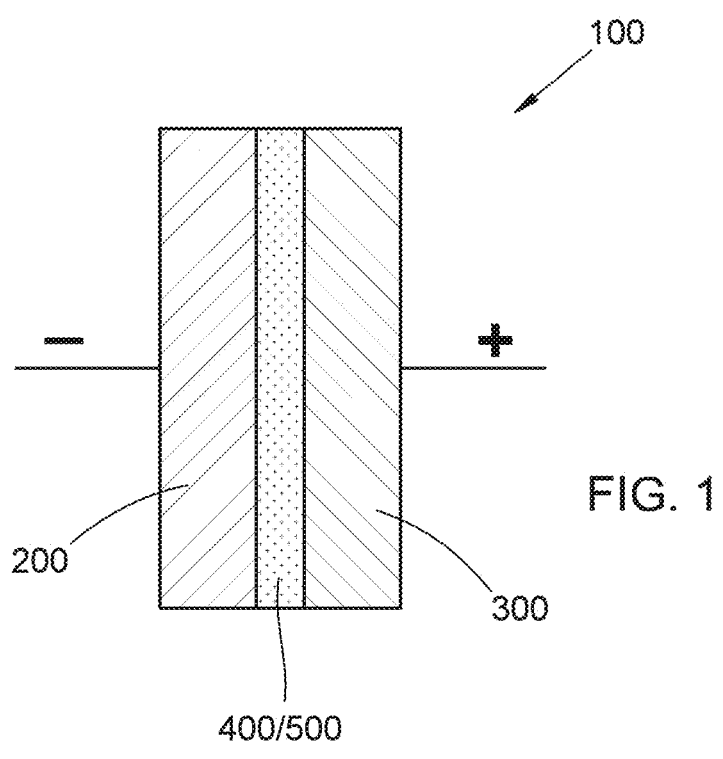
FIG. 1
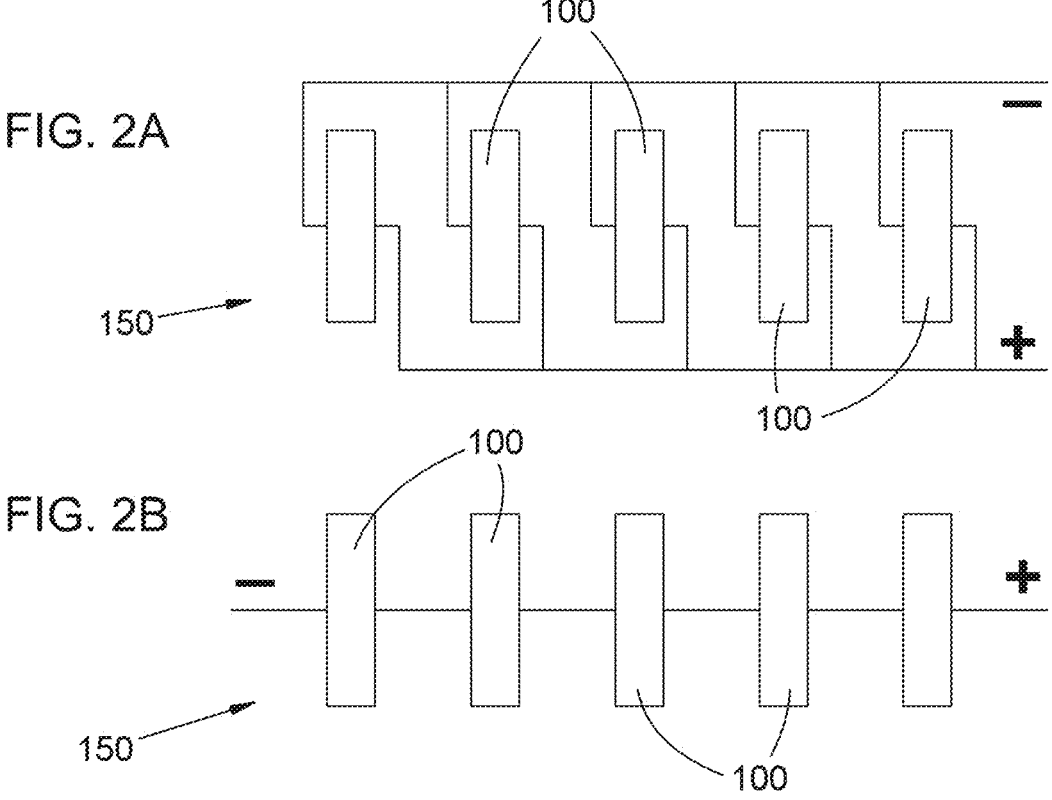
FIG. 2A
FIG. 2B 210                    210

FIG. 6A                    FIG. 6B

RECHARGEABLE ZINC METAL BATTERY

BENEFIT CLAIMS TO RELATED APPLICATIONS

This application claims benefit of U.S. Provisional App. No. 63/223,414 entitled "Rechargeable zinc metal battery" filed Jul. 19, 2021 in the names of Xiulei Ji and Heng Jiang, said provisional application being incorporated by reference as if set forth herein in its entirety.

STATEMENT REGARDING FEDERALLY SPONSORED RESEARCH OR DEVELOPMENT

This invention was made with government support under SBIR Phase I Grant #2012221 awarded by the National Science Foundation. The government has certain rights in the invention.

FIELD OF THE INVENTION

The field of the present invention relates to rechargeable batteries. In particular, zinc metal batteries, aqueous electrolyte compositions therefor, and methods of making thereof are disclosed.

SUMMARY

A rechargeable zinc metal battery cell includes a zinc metal anode, a cathode, a porous separator, and an electrolyte composition. The porous separator is sandwiched between the anode and the cathode and blocks direct electrical contact between them. The electrolyte composition is absorbed by the porous separator, infiltrating or soaking the separator so that the electrolyte composition is in contact with both the anode and the cathode. The electrolyte composition comprises (i) an aqueous solution of zinc chloride $(ZnCl_2)$ having a zinc chloride concentration greater than 15 molal, and (ii) dimethyl carbonate $((CH_3O)_2CO)$ present at a mass ratio between 0.1:1.0 and 1.0:1.0 with respect to water in the aqueous solution.

In some examples the anode can include zinc metal foil stacked on titanium metal foil. In some examples the cathode can include vanadium(V) phosphate $(VOPO_4)$. In some examples the porous separator can include glass fibers and can be less than 200 μm thick. In some examples the electrolyte composition can comprise (i) an aqueous solution of 30 molal zinc chloride $(ZnCl_2)$, 5 molal lithium chloride (LiCl), and 10 molal trimethyl ammonium chloride (NH $(CH_3)_3Cl)$, and (ii) dimethyl carbonate $((CH_3O)_2CO)$ present at a mass ratio of 1.0:1.0 with respect to water in the aqueous solution.

Objects and advantages pertaining to rechargeable zinc metal batteries may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 illustrates schematically a cross section of a battery cell.

FIGS. 2A and 2B illustrate schematically multicell batteries.

FIGS. 6A and 6B are electron micrographs of two different zinc metal anodes after 200 charge-discharge cycles.

Figures 3A, 3B:
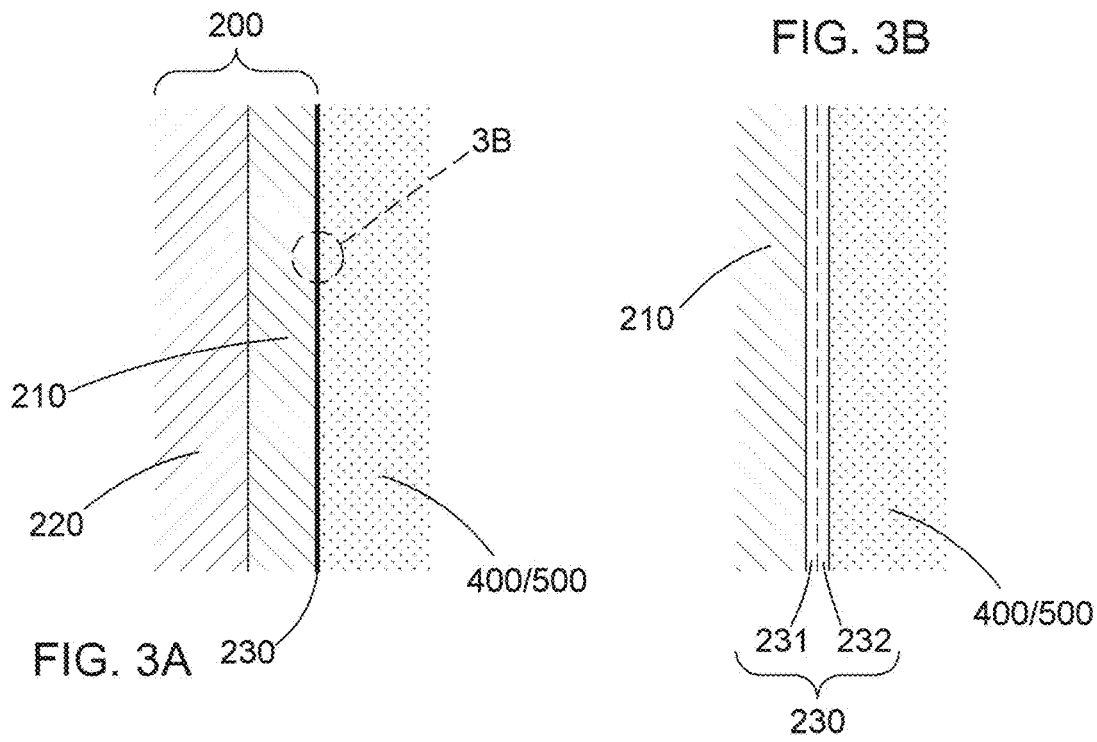
FIGS. 3A and 3B illustrate schematically a cross section of a portion of a battery cell that includes a passivation layer on the anode.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the disclosed inventive subject matter. The detailed description illustrates by way of example, not by way of limitation, the principles of the inventive subject matter. Subject matter disclosed herein may be related to subject matter disclosed in U.S. Pub. No. 2021/0336293 published Oct. 28, 2021, which is incorporated by reference as if set forth herein in its entirety.

An increasing need exists for rechargeable batteries for a broad range of applications, from small, handheld or portable devices to electric vehicles to aircraft to grid storage. There is a need for new battery materials that are cheaper, safer, less environmentally impactful, or otherwise improve upon existing materials. Zinc metal batteries achieve some of those goals, but achieving Coulombic efficiency sufficiently high for enabling commercial deployment of zinc metal batteries has been problematic.

An inventive rechargeable zinc metal battery cell 100 is illustrated schematically in FIG. 1 and includes an anode 200, a cathode 300, a porous separator 400, and an electrolyte composition 500. The porous separator 400 is sandwiched between the anode 200 and the cathode 300 and blocks direct electrical contact between them. The electrolyte composition 500 is absorbed by the porous separator 400, infiltrating or soaking the separator 400 so that the electrolyte composition 500 is in contact with both the anode 200 and the cathode 300. The anode 200 includes zinc metal. The electrolyte composition 500 comprises (i) an aqueous solution of zinc chloride $(ZnCl_2)$ having a zinc chloride concentration greater than 15 molal (i.e., greater than 15 moles of zinc chloride solute per kilogram of water solvent), and (ii) dimethyl carbonate $((CH_3O)_2CO)$ present at a mass ratio between 0.1:1.0 and 1.0:1.0 with respect to water in the aqueous solution (i.e., dimethyl carbonate mass ranging from about one tenth of the water mass up to about equal to the water mass).

In some examples the zinc chloride concentration of the aqueous solution can be greater than 20 molal, greater than 25 molal, or greater than 29 molal. In some examples the zinc chloride concentration of the aqueous solution can be 30. Aqueous zinc chloride saturates at about 31 molal at room temperature, putting a natural upper limit on the zinc chloride concentration.

In some examples the aqueous solution can include an additional source of chloride, such as an inorganic chloride compound or an organic chloride compound, in a concentration greater than 3 molal. In some examples the aqueous solution can include lithium chloride (LiCl) in a concentration that is (i) greater than 3 molal or greater than 4 molal, and (ii) less than 7 molal or less than 6 molal; in some examples the concentration of lithium chloride (LiCl) the aqueous solution can be 5 molal. In some examples the aqueous solution can include an alkyl ammonium chloride in a concentration greater than 5 molal. In some examples the alkyl ammonium chloride can be trimethyl ammonium chloride ($NH(CH_3)_3Cl$) in a concentration that is (i) greater than 5 molal or greater than 8 molal, and (ii) less than 15 molal or less than 12 molal; in some examples the trimethyl ammonium chloride ($NH(CH_3)_3Cl$) concentration can be 10 molal.

In some examples the dimethyl carbonate (($CH_3O)_2CO$) can be present in the electrolyte composition 500 at a mass ratio with respect to water that is greater than 0.1:1.0 (i.e., the mass of dimethyl carbonate present is greater than one tenth of the mass of water present). In some examples the dimethyl carbonate can be present in the electrolyte composition 500 at a mass ratio (with respect to water) greater than 0.2:1.0, greater than 0.3:1.0, greater than 0.5:1.0, greater than 0.7:1.0, greater than 0.8:1.0, or greater than 0.9:1.0. In some examples the dimethyl carbonate can be present in the electrolyte composition 500 at a mass ratio with respect to water of 1.0:1.0 (i.e., masses of dimethyl carbonate and water present being about equal). If the concentration of dimethyl carbonate is too high (e.g., mass ratio with respect to water of about 1.2:1.0 or greater), the electrolyte composition might become flammable, which is a safety concern when used in a battery cell. Keeping the mass ratio at 1.0:1.0 or less can reduce the risk that the electrolyte composition 500 would be flammable.

In some examples (e.g., as in illustrated schematically in FIG. 3A), the anode 200 can include zinc metal foil 210 in electrical contact with an electrically conductive current collector made of, e.g., titanium or other metal resistant to corrosive effects of the electrolyte composition 500, graphite or other conductive form of carbon, or one or more conductive polymers. In some examples the anode 200 can include zinc metal foil 210 stacked onto titanium metal foil 220. In some examples the battery cell 100 can include a passivation layer 230, sometimes referred to as a solid-electrolyte interphase (SEI) layer (e.g., as illustrated schematically in FIGS. 3A and 3B and shown in the electron micrograph of FIG. 4). In some examples in which the electrolyte composition 500 includes dimethyl carbonate, the passivation layer 230 can include zinc, oxygen, chlorine, and carbon. The passivation layer 230 can be formed on a surface of the zinc metal foil 210 that faces the separator 400, so that the electrolyte composition 500 is not in direct contact with the zinc metal of the foil 210, but is in contact with the anode 200 through the passivation layer 230. In some examples the passivation layer 230 can be (i) greater than 100 nm thick, or greater than 150 nm thick, and (ii) less than 300 nm thick, or less than 250 nm thick; in some examples the passivation layer 230 can be about 200 nm thick.

Figure 4:
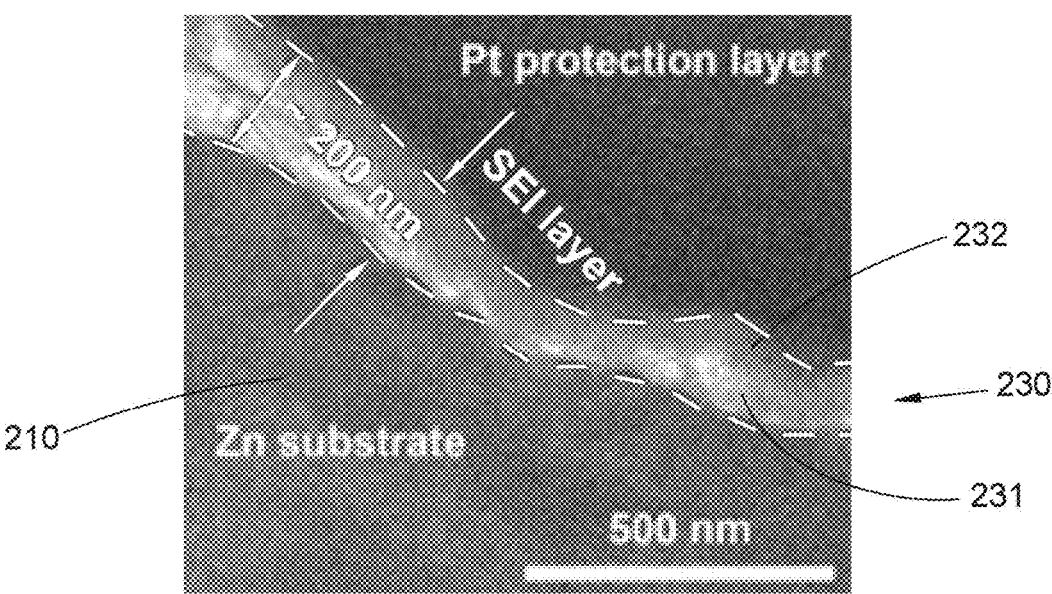
FIG. 4 is an electron micrograph of a zinc metal anode with a passivation layer.
Figure 5:
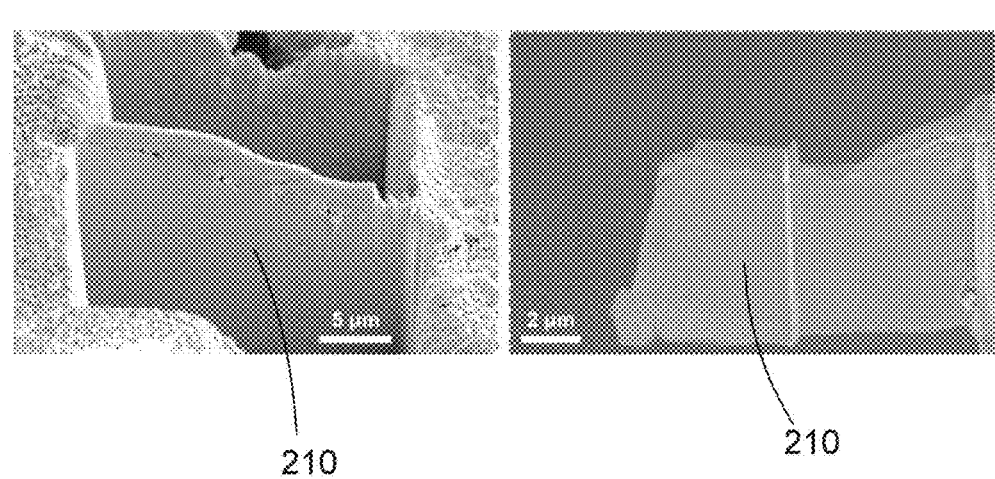
FIG. 5 is an electron micrograph of a zinc metal anode after 200 charge-discharge cycles.
Figure 5:
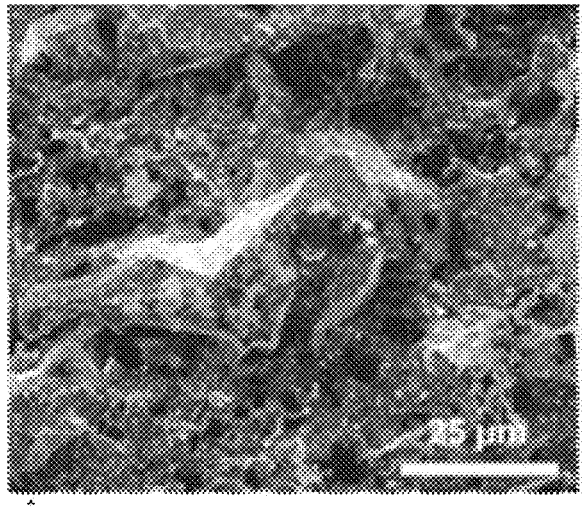
Figure 5:
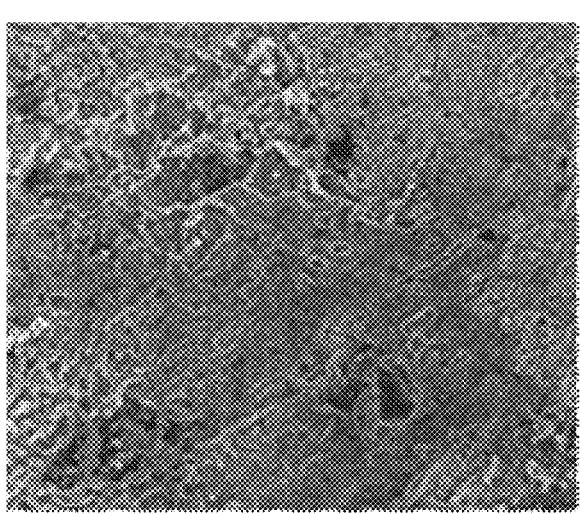

In some examples the passivation layer 230 appears to include two distinct portions: one portion 231 adjacent the zinc metal foil 210 and a second portion 232 adjacent the separator 400 and the electrolyte composition 500. Such examples are illustrated schematically in FIG. 3B and shown in the electron micrograph of FIG. 4 (which shows a zinc metal anode 200 after 200 charge-discharge cycles in an electrolyte composition 500 that included aqueous 30 molal zinc chloride, 5 molal lithium chloride, and 10 molal trimethyl ammonium chloride, and dimethyl carbonate present at a mass ratio of 1.0:1.0 with respect to water). In some examples the composition of the passivation layer 230 differs between the portions 231 and 232 of the passivation layer 230. In some examples the portion 231 and 232 of the passivation layer 230 can be clearly demarcated; in other examples one portion blends into the other without a distinct border between them. In some examples (e.g., such as shown in FIG. 3B or 4) carbon can be found in the portion 232 of the passivation layer 230 but at most negligible amounts of carbon, or no carbon, can be found in the portion 231 of the passivation layer 230. In some examples carbon can be substantially absent from portions 231 of the passivation layer 230 that are less than 50 nm from the zinc metal foil 210, or less than 100 nm from the zinc metal foil 210. In some examples, even after multiple charge/discharge cycles, the zinc metal foil 210 can be substantially devoid of dendrites or other significant rough topography, or can have no porosity or only negligible porosity. FIG. 5 is an electron micrograph of a portion of the zinc metal anode after 200 charge-discharge cycles and shows no (or only negligible) porosity. FIGS. 6A and 6B (same scale) are electron micrographs of surfaces of two different zinc metal anodes after 200 charge-discharge cycles. The anode of FIG. 6A was used with an electrolyte composition including only aqueous 30 molal zinc chloride; the anode FIG. 6B was used with an electrolyte composition including aqueous 30 molal zinc chloride, 5 molal lithium chloride, and 10 molal trimethyl ammonium chloride, and dimethyl carbonate present at a mass ratio of 1.0:1.0 with respect to water. The surface of the anode in FIG. 6A exhibits significant micron-scale "mountainous" topography indicative of dendritic growth, while the surface of the anode in FIG. 6B is quite smooth.

The cathode 300 can be of any suitable type, composition, or arrangement that is compatible and stable with respect to the electrolyte composition 500. In some examples the cathode 300 can include any one or more of (vi) vanadium (V) phosphate (also known as vanadyl phosphate; $VOPO_4$), (ii) lithium iron phosphate ($LiFePO_4$), (iii) a metal ion insertion material, (iv) a zinc-containing anion insertion material, (v) a radical polymer or a conductive polymer, or (vi) polypyrene. The porous separator 400 can be of any suitable type, composition, or arrangement that is compatible and stable with respect to the electrolyte composition 500. In some examples the porous separator 400 can include any one or more of (i) one or more polymers, (ii) silica-coated polymer fibers, (iii) glass fibers, (iv) polypropylene membranes, (v) polycarbonate membranes, or (vi) paper or other cellulose membranes. In some examples the porous separator 400 can have a thickness that is (i) greater than 5 μm, greater than 10 μm, greater than 20 μm, greater than 50 μm, or greater than 100 μm, and (ii) less than 500 μm, less than 300 μm, less than 200 μm, less than 150 μm, or less than 100 μm.

In some examples the battery cell 100 comprises: (a) an anode 200 that includes zinc metal foil 210 stacked onto titanium metal foil 220; (b) an cathode 300 that includes vanadium (V) phosphate ($VOPO_4$); (c) a porous separator 400 that includes glass fibers and is less than 200 μm thick; and (d) an electrolyte composition that comprises (i) an aqueous solution of 30 molal zinc chloride ($ZnCl_2$), 5 molal lithium chloride (LiCl), and 10 molal trimethyl ammonium chloride (NH(CH$_3$)$_3$Cl), and (ii) dimethyl carbonate ((CH$_3$O)$_2$CO) present at a mass ratio of 1.0:1.0 with respect to water in the aqueous solution.

Coulombic efficiency is a measure of the fraction of zinc atoms stripped from the anode 200 (during discharging of the battery cell 100) that are replated onto the anode 200 (during a subsequent charging of the battery cell 100). For reference, the following Coulombic efficiencies have been observed for zinc metal anodes: 95% with a 30 molal aqueous zinc chloride electrolyte; 97% with a 30 molal zinc chloride, 5 molal lithium chloride electrolyte; and 99.6% with a 30 molal zinc chloride, 5 molal lithium chloride, 10 molal trimethyl ammonium chloride electrolyte. In some examples the battery cell 100 can exhibit a Coulombic efficiency greater than 99%, greater than 99.2%, greater than 99.5%, greater than 99.7%, greater than 99.9%, or greater than 99.93% when operated at a current density of 0.2 mA/cm$^2$. In one example wherein the electrolyte composition 500 includes only 30 molal aqueous zinc chloride and dimethyl carbonate at a mass ratio of 1.0:1.0 with respect to water in the electrolyte composition 500, Coulombic efficiency of 99.3% has been observed. In one example wherein the electrolyte composition includes 30 molal zinc chloride, 5 molal lithium chloride, 10 molal trimethyl ammonium chloride, and dimethyl carbonate at a mass ratio of 1.0:1.0 with respect to water, Coulombic efficiency of 99.95% has been observed. In some examples the battery cell 100 can exhibit negligible capacity loss after 300 charge-discharge cycles; in some examples the battery cell 100 can retain at least 80% capacity after 4000 charge-discharge cycles. The performance characteristics noted above were observed in so-called pouch cells (e.g., cell 100 or multiple connected cells 100 enclosed in polymer-coated aluminum film), which are commonly used in commercial lithium-ion batteries such as those used in cell phones.

It has been proposed that the formation and presence of the passivation layer 230 on the zinc metal anode 200, or the lack of dendrites or porosity of the zinc metal anode 200, might contribute to the high Coulombic efficiencies that have been observed. It has been proposed that the presence of dimethyl carbonate in the electrolyte composition 500 might enable formation and stability of the passivation layer 230 on the zinc metal anode 200, or might enable zinc atoms to be stripped during discharging and replated during charging without forming dendrites or pores in the zinc metal of the anode 200. However, a battery cell 100 that falls within the scope of inventive subject matter disclosed or claimed herein can do so regardless of any particular mechanism that underlies its observed behavior or performance.

In some examples the battery cell 100 can exhibit an energy density greater than 50 Wh/kg, greater than 70 Wh/kg, greater than 90 Wh/kg, greater than 100 Wh/kg, or greater than 110 Wh/kg. In some examples the battery cell 100 can have an N/P ratio greater than 1.0, greater than 1.1, greater than 1.5, or about equal to 2. In some examples the battery cell 100 can exhibit a discharge capacity greater than 1.0 mAh/cm$^2$, greater than 1.5 mAh/cm$^2$, greater than 2.0 mAh/cm$^2$, or greater than 2.5 mAh/cm$^2$.

A method for making any of the rechargeable battery cells 100 disclosed herein comprises: (A) assembling together the zinc metal anode 200, the cathode 300, and the porous separator 400 between them; and (B) adding the electrolyte composition 500 that is absorbed by the porous separator 400 so that the electrolyte composition 500 is in contact with both the anode 200 and the cathode 300.

A rechargeable multi-cell battery 150 can include multiple rechargeable battery cells 100 connected either in parallel (cathode-to-cathode and anode-to-anode, as in FIG. 2A; to increase current at a given voltage) or in series (cathode-to-anode, as in FIG. 2B; to increase voltage at a given current).

In addition to the preceding, the following example embodiments fall within the scope of the present disclosure or appended claims:

Example 1. A rechargeable battery cell comprising: (a) an anode that includes zinc metal; (b) a cathode; (c) a porous separator between the anode and the cathode and blocking direct electrical contact therebetween; and (d) an electrolyte composition absorbed by the porous separator and in contact with both the anode and the cathode, the electrolyte composition comprising (i) an aqueous solution of zinc chloride (ZnCl$_2$) having a zinc chloride concentration greater than 15 molal, and (ii) dimethyl carbonate ((CH$_3$O)$_2$CO) present at a mass ratio between about 0.1:1.0 and about 1.0:1.0 with respect to water in the aqueous solution.

Example 2. The battery cell of Example 1, the zinc chloride concentration of the aqueous solution being greater than 20 molal, greater than 25 molal, or greater than 29 molal.

Example 3. The battery cell of Example 1, the zinc chloride concentration of the aqueous solution being 30. molal.

Example 4. The battery cell of any one of Examples 1 through 3, the aqueous solution further comprising an inorganic chloride compound or an organic chloride compound in a concentration greater than 3 molal.

Example 5. The battery cell of any one of Examples 1 through 4, the aqueous solution further comprising lithium chloride (LiCl) in a concentration that is (i) greater than 3 molal or greater than 4 molal, and (ii) less than 7 molal or less than 6 molal.

Example 6. The battery cell of Example 5, the concentration of lithium chloride (LiCl) the aqueous solution being 5 molal.

Example 7. The battery cell of any one of Examples 4 through 6, the aqueous solution further comprising an alkyl ammonium chloride in a concentration greater than 5 molal.

Example 8. The battery cell of Example 7, the alkyl ammonium chloride being trimethyl ammonium chloride (NH(CH$_3$)$_3$Cl) in a concentration that is (i) greater than 5 molal or greater than 8 molal, and (ii) less than 15 molal or less than 12 molal.

Example 9. The battery cell of Example 7, the alkyl ammonium chloride being trimethyl ammonium chloride (NH(CH$_3$)$_3$Cl) in a concentration of 10 molal.

Example 10. The battery cell of any one of Examples 1 through 9, the dimethyl carbonate ((CH$_3$O)$_2$CO) being present in the electrolyte composition at a mass ratio with respect to water than is greater than 0.2:1.0, greater than 0.3:1.0, greater than 0.5:1.0, greater than 0.7:1.0, greater than 0.8:1.0, or greater than 0.9:1.0.

Example 11. The battery cell of any one of Examples 1 through 10, the dimethyl carbonate ((CH$_3$O)$_2$CO) being present in the electrolyte composition at a mass ratio with respect to water of 1.0:1.0.

Example 12. The battery cell of any one of Examples 1 through 11, the electrolyte composition being non-flammable.

Example 13. The battery cell of any one of Examples 1 through 12, the anode including zinc metal foil in electrical contact with an electrically conductive current collector.

Example 14. The battery cell of Example 13, the anode including zinc metal foil stacked onto titanium metal foil.

Example 15. The battery cell of any one of Examples 13 or 14, further comprising a passivation layer comprising zinc, oxygen, chlorine, and carbon, the passivation layer being formed on a surface of the zinc metal foil that faces the separator.

Example 16. The battery cell of Example 15, the passivation layer being (i) greater than 100 nm thick, or greater than 150 nm thick, and (ii) less than 300 nm thick, or less than 250 nm thick.

Example 17. The battery cell of Example 16, the passivation layer being about 200 nm thick.

Example 18. The battery cell of any one of Examples 15 through 17, carbon being substantially absent from portions of the passivation layer less than 50 nm from the zinc metal foil, or less than 100 nm from the zinc metal foil.

Example 19. The battery cell of any one of Examples 13 through 18, the zinc metal foil (i) being substantially devoid of dendrites or (ii) having negligible porosity.

Example 20. The battery cell of any one of Examples 1 through 19, the cathode including any one or more of (vi) vanadium (V) phosphate ($VOPO_4$), (ii) lithium iron phosphate ($LiFePO_4$), (iii) a metal ion insertion material, (iv) a zinc-containing anion insertion material, (v) a radical polymer or a conductive polymer, or (vi) polypyrene.

Example 21. The battery cell of any one of Examples 1 through 20, the cathode including vanadium (V) phosphate ($VOPO_4$).

Example 22. The battery cell of any one of Examples 1 through 21, the porous separator including any one or more of (i) one or more polymers, (ii) silica-coated polymer fibers, (iii) glass fibers, (iv) polypropylene membranes, (v) polycarbonate membranes, or (vi) paper or other cellulose membranes.

Example 23. The battery cell of any one of Examples 1 through 22, the porous separator having a thickness that is (i) greater than 5 μm, greater than 10 μm, greater than 20 μm, greater than 50 μm, or greater than 100 μm, and (ii) less than 500 μm, less than 300 μm, less than 200 μm, less than 150 μm, or less than 100 μm.

Example 24. The battery cell of any one of Examples 1 through 23, wherein: (a') the anode includes zinc metal foil stacked onto titanium metal foil; (b') the cathode includes vanadium (V) phosphate ($VOPO_4$); (c') the porous separator includes glass fibers and is less than 200 μm thick; and (d') the electrolyte composition comprises (i) an aqueous solution of 30 molal zinc chloride ($ZnCl_2$), 5 molal lithium chloride (LiCl), and 10 molal trimethyl ammonium chloride ($NH(CH_3)_3Cl$), and (ii) dimethyl carbonate ($(CH_3O)_2CO$) present at a mass ratio of 1.0:1.0 with respect to water in the aqueous solution.

Example 25. The battery cell of any one of Examples 1 through 24, the battery cell exhibiting a Coulombic efficiency greater than 99%, greater than 99.2%, greater than 99.5%, greater than 99.7%, greater than 99.9%, or greater than 99.93% when operated at a current density of 0.2 mA/cm².

Example 26. The battery cell of any one of Examples 1 through 25, the battery cell exhibiting an energy density greater than 50 Wh/kg, greater than 70 Wh/kg, greater than 90 Wh/kg, greater than 100 Wh/kg, or greater than 110 Wh/kg.

Example 27. The battery cell of any one of Example 1 through 26, the battery cell having an N/P ratio greater than 1.0, greater than 1.1, greater than 1.5, or about equal to 2.

Example 28. The battery cell of any one of Examples 1 through 27, the battery cell exhibiting a discharge capacity greater than 1.0 mAh/cm², greater than 1.5 mAh/cm², greater than 2.0 mAh/cm², or greater than 2.5 mAh/cm².

Example 29. The battery cell of Example 28, the battery cell exhibiting negligible capacity loss after 300 charge-discharge cycles.

Example 30. The battery cell of any one of Examples 28 or 29, the battery cell retaining at least 80% capacity after 4000 charge-discharge cycles.

Example 31. A rechargeable multi-cell battery comprising multiple rechargeable battery cells of any one of Examples 1 through 30 connected together in parallel.

Example 32. A rechargeable multi-cell battery comprising multiple rechargeable battery cells of any one of Examples 1 through 30 connected together in series.

Example 33. A rechargeable battery comprising one or more battery cells of any one of Examples 1 through 30 enclosed within a sealed pouch, the pouch including a metal-coated polymer film.

Example 34. A method for making the rechargeable battery cell of any one of Examples 1 through 30, the method comprising: (A) assembling together the anode, the cathode, and the porous separator therebetween, the porous separator blocking direct electrical contact between the anode and the cathode; and (B) adding the electrolyte composition that is absorbed by the porous separator so that the electrolyte composition is in contact with both the anode and the cathode.

Example 35. The electrolyte composition of any one of Examples 1 through 30.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each. In another example, each of "a dog, a cat, or a mouse," "one or more of a dog, a cat, or a mouse," and "one or more dogs, cats, or mice" would be interpreted as (i) one or more dogs without any cats or mice, (ii) one or more cats without any dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. In another example, each of "two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without any dogs, or (iv) one or more dogs, one or more cats, and one or more mice; "three or more," "four or more," and so on would be analogously interpreted.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ substantially from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A rechargeable battery cell comprising:
   (a) an anode that includes zinc metal;
   (b) a cathode;
   (c) a porous separator between the anode and the cathode and blocking direct electrical contact therebetween; and
   (d) an electrolyte composition absorbed by the porous separator and in contact with both the anode and the cathode, the electrolyte composition comprising (i) an aqueous solution of zinc chloride ($ZnCl_2$) having a zinc chloride concentration greater than 15 molal and less than or equal to 30 molal, and
   (ii) dimethyl carbonate (($CH_3O)_2CO$) present at a mass ratio between about 0.1:1.0 and about 1.0:1.0 with respect to water in the aqueous solution.

2. The battery cell of claim 1, the zinc chloride concentration of the aqueous solution being 30 molal.

3. The battery cell of claim 1, the aqueous solution further comprising an inorganic chloride compound or an organic chloride compound in a concentration greater than 3 molal.

4. The battery cell of claim 1, the aqueous solution further comprising lithium chloride in a concentration of 5 molal.

5. The battery cell of claim 1, the aqueous solution further comprising an alkyl ammonium chloride in a concentration greater than 5 molal.

6. The battery cell of claim 5, the alkyl ammonium chloride being trimethyl ammonium chloride ($NH(CH_3)_3Cl$) in a concentration of 10 molal.

7. The battery cell of any claim 1, the dimethyl carbonate $((CH_3O)_2CO)$ being present in the electrolyte composition at a mass ratio with respect to water that is greater than 0.5:1.0.

8. The battery cell of claim 1, the dimethyl carbonate $((CH_3O)_2CO)$ being Present in the electrolyte composition at a mass ratio with respect to water of 1.0:1.0.

9. The battery cell of claim 1, the electrolyte composition being non-flammable.

10. The battery cell of claim 1, the anode including zinc metal foil in electrical contact with an electrically conductive current collector.

11. The battery cell of claim 10 further comprising a passivation layer comprising zinc, oxygen, chlorine, and carbon, the passivation layer being formed on a surface of the zinc metal foil that faces the separator.

12. The battery cell of claim 11, the passivation layer being greater than 100 nm thick and less than 300 nm thick.

13. The battery cell of claim 11, carbon being substantially absent from portions of the passivation layer less than 50 nm from the zinc metal foil.

14. The battery cell of claim 10, the zinc metal foil (i) being substantially devoid of dendrites or (ii) having negligible porosity.

15. The battery cell of claim 1, the cathode including any one or more of (vi) vanadium (V) phosphate $(VOPO_4)$, (ii) lithium iron phosphate $(LiFePO_4)$, (iii) a metal ion insertion material, (iv) a zinc-containing anion insertion material, (v) a radical polymer or a conductive polymer, or (vi) polypyrene.

16. The battery cell of claim 1, the porous separator including any one or more of (i) one or more polymers, (ii) silica-coated polymer fibers, (iii) glass fibers, (iv) polypropylene membranes, (v) polycarbonate membranes, or (vi) paper or other cellulose membranes.

17. The battery cell of claim 1, wherein:
(a') the anode includes zinc metal foil stacked onto titanium metal foil;
(b') the cathode includes vanadium (V) phosphate $(VOPO_4)$;
(c') the porous separator includes glass fibers and is less than 200 μm thick; and
(d') the electrolyte composition comprises (i) an aqueous solution of 30 molal zinc chloride $(ZnCl_2)$, 5 molal lithium chloride (LiCl), and 10 molal trimethyl ammonium chloride $(NH(CH_3)_3Cl)$, and (ii) dimethyl carbonate $((CH_3O)_2CO)$ present at a mass ratio of 1.0:1.0 with respect to water in the aqueous solution.

18. The battery cell of claim 1, the battery cell exhibiting a Coulombic efficiency greater than 99.5% when operated at a current density of 0.2 mA/cm$^2$.

19. The battery cell of claim 1, the battery cell exhibiting a Coulombic efficiency greater than 99.9% when operated at a current density of 0.2 mA/cm$^2$.

20. The battery cell of claim 1, the battery cell exhibiting negligible loss of discharge capacity after 300 charge-discharge cycles, or retaining at least 80% discharge capacity after 4000 charge-discharge cycles.

21. A rechargeable multi-cell battery comprising multiple rechargeable battery cells of claim 1 connected together either in parallel or in series.

22. A rechargeable battery comprising one or more battery cells of claim 1 enclosed within a sealed pouch, the pouch including a metal-coated polymer film.

23. An electrolyte composition comprising:
(a) an aqueous solution of zinc chloride $(ZnCl_2)$ having a zinc chloride concentration greater than 15 molal and less than or equal to 30 molal; and
(b) dimethyl carbonate $((CH_3O)_2CO)$ present at a mass ratio between about 0.1:1.0 and about 1.0:1.0 with respect to water in the aqueous solution.

24. A method for making a rechargeable battery cell, the method comprising:
(A) assembling together an anode that includes zinc metal, a cathode, and a porous separator therebetween, the porous separator blocking direct electrical contact between the anode and the cathode; and
(B) adding an electrolyte composition that is absorbed by the porous separator so that the electrolyte composition is in contact with both the anode and the cathode, the electrolyte composition comprising (i) an aqueous solution of zinc chloride $(ZnCl_2)$ having a zinc chloride concentration greater than 15 molal and less than or equal to 30 molal, and (ii) dimethyl carbonate $((CH_3O)_2CO)$ present at a mass ratio between about 0.1:1.0 and about 1.0:1.0 with respect to water in the aqueous solution.

* * * * *